United States Patent
Lee et al.

(10) Patent No.: US 10,101,823 B2
(45) Date of Patent: Oct. 16, 2018

(54) DATA INPUT SYSTEM AND OPERATION METHOD THEREOF

(71) Applicant: SAMSUNG ELECTRONICS CO., LTD., Suwon-si (KR)

(72) Inventors: Sun-rock Lee, Cheonan-si (KR); Tae-soon Park, Hwaseong-si (KR); Han-jin Park, Suwon-si (KR); Yong-min Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 15/184,291

(22) Filed: Jun. 16, 2016

(65) Prior Publication Data

US 2017/0045960 A1    Feb. 16, 2017

(30) Foreign Application Priority Data

Aug. 10, 2015    (KR) .................. 10-2015-0112726

(51) Int. Cl.
| | |
|---|---|
| *G06F 3/0354* | (2013.01) |
| *G06F 3/0488* | (2013.01) |
| *G09G 5/04* | (2006.01) |
| *G06F 3/038* | (2013.01) |
| *G06F 3/147* | (2006.01) |
| *G09G 3/20* | (2006.01) |
| *G09G 5/02* | (2006.01) |

(52) U.S. Cl.
CPC ........ *G06F 3/03545* (2013.01); *G06F 3/0383* (2013.01); *G06F 3/04883* (2013.01); *G06F 3/147* (2013.01); *G09G 3/2003* (2013.01); *G09G 5/026* (2013.01); *G09G 5/04* (2013.01); *G09G 2320/0693* (2013.01); *G09G 2340/06* (2013.01); *G09G 2354/00* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 6,556,190 B2 | 4/2003 | Fleck et al. | |
| 2012/0182271 A1* | 7/2012 | Wu | .............. G06F 3/03545 345/179 |

(Continued)

FOREIGN PATENT DOCUMENTS

| | | |
|---|---|---|
| JP | 08-115154 A | 5/1996 |
| KR | 10-0511830 B1 | 9/2005 |
| WO | 2006/043287 A1 | 4/2006 |

*Primary Examiner* — Joseph Haley
*Assistant Examiner* — Emily Frank
(74) *Attorney, Agent, or Firm* — Sughrue Mion, PLLC

(57) ABSTRACT

A data input device, an electronic device using the data input device, and an operation method based on the data input device and the electronic device are provided. The data input device for effectively changing a color of data to be input to the electronic device includes a color changer configured to change a color of data to be input to the electronic device, a communicator configured to communicate with the electronic device, and a controller configured to receive an output signal from the color changer, to convert the received output signal into color identification information, and to control the communicator to transmit the converted color identification information to the electronic device.

10 Claims, 12 Drawing Sheets

(56) References Cited

U.S. PATENT DOCUMENTS

2012/0331546 A1* 12/2012 Falkenburg ......... G06F 3/03545
726/16
2013/0106721 A1* 5/2013 Pedersen ................. G06F 3/016
345/173

* cited by examiner

FIG. 5

| OUTPUT VOLTAGE | DIGITAL SIGNAL |
|---|---|
| 0.0 V ~ 0.3 V | 0001 |
| 0.4 V ~ 0.6 V | 0010 |
| 0.7 V ~ 1.0 V | 0011 |

FIG. 6

| DIGITAL SIGNAL | COLOR IDENTIFICATION INFORMATION (HID format) |
|---|---|
| 0001 | 0x70 |
| 0010 | 0x71 |
| 0011 | 0x72 |

FIG. 7

| COLOR IDENTIFICATION INFORMATION (HID format) | COLOR INFORMATION |
|---|---|
| 0x70 | BLACK |
| 0x71 | RED |
| 0x72 | BLUE |

| DIGITAL SIGNAL | COLOR IDENTIFICATION INFORMATION (HID format) | | |
|---|---|---|---|
| | IOT NETWORK BASED DEVICE | SMART PHONE | ELECTRONIC BLACKBOARD |
| 0001 | 0x90 | 0x80 | 0x70 |
| 0010 | 0x92 | 0x81 | 0x71 |
| 0011 | 0x92 | 0x82 | 0x72 |

DATA INPUT SYSTEM AND OPERATION METHOD THEREOF

CROSS-REFERENCE TO RELATED APPLICATION

This application claims the benefit of Korean Patent Application No. 10-2015-0112726, filed on Aug. 10, 2015, in the Korean Intellectual Property Office, the disclosure of which is incorporated herein in its entirety by reference.

BACKGROUND

1. Field

Apparatuses and methods consistent with exemplary embodiments relate to a data input system, and more particularly, to a data input device, an electronic device using the data input device, and an operation method based on the data input device and the electronic device.

2. Description of the Related Art

According to the rapid supply of electronic devices having a touch panel on a display such as electronic blackboards or smart phones, use of data input devices such as electronic pens has increased.

A data input device may be used to input data based on a display of an electronic device like writing a letter on paper with a pen and also be used to select data displayed on the display of the electronic device.

Therefore, according to increase in use of data input devices, a smarter data input device is required.

SUMMARY

One or more exemplary embodiments provide a data input system and an operation method for effectively changing a color of data to be input to an electronic device.

Additional aspects will be set forth in part in the description which follows and, in part, will be apparent from the description, or may be learned by practice of exemplary embodiments.

According to an aspect of an exemplary embodiment, there is provided a data input device includes a color changer configured to change a color of data to be input to an electronic device, a communicator configured to communicate with the electronic device, and a controller configured to receive an output signal from the color changer, to convert the received output signal into color identification information, and to control the communicator to transmit the converted color identification information to the electronic device.

The color changer may include a non-contact potentiometer including a plurality of magnetic resistance devices, and the output signal may include an output voltage according to a rotation angle of a permanent magnet included in the non-contact potentiometer.

The data input device may include a storage configured to store at least one mapping information to convert the output signal into the color identification information. The mapping information may include mapping information between a signal capable of being output from the color changer and a digital signal, and mapping information between the digital signal and color identification information for the electronic device.

The data input device may include a display configured to display a notification of color information corresponding to the color identification information.

The data input device may include an audio outputter configured to output an audio signal of color information corresponding to the color identification information.

The communicator may transmit the color identification information to the electronic device wirelessly.

The storage may store mapping information about a plurality of electronic devices. The mapping information may be used to convert the output signal into the color identification information and include mapping information between a signal capable of being output from the color changer and a digital signal, and mapping information between the digital signal and color identification information for the electronic device. The controller may use mapping information about the electronic device from among the mapping information about the plurality of electronic devices based on an electronic device and transmit or receive data through the communicator.

According to an aspect of another exemplary embodiment, there is provided an electronic device capable of using a data input device, the electronic device includes a touch panel configured to react in response to a touch of the data input device, a display configured to display data input by the data input device, a communicator configured to communicate with the data input device, and a controller configured to display a color of data input by the data input device on the display, in response to determining that color identification information is received from the data input device through the communicator, based on the received color identification information.

The electronic device may include a storage configured to store mapping information between the color identification information received from the data input device and color information. The controller may detect color information corresponding to the received color identification information by using the mapping information, and control the display to display the color of data to be input based on the detected color information.

The display may display a notification of color information corresponding to the received color identification information. The controller may detect the color information by using the color identification information in response to receiving the color identification information, and control the display to display the notification on the display based on the detected color information.

According to an aspect of another exemplary embodiment, there is provided an operation method of a data input device, the operation method includes generating an output signal of a color changer capable of changing a color of data to be input to an electronic device, converting the output signal into color identification information, and transmitting the color identification information to the electronic device through a communicator of the data input device.

The color changer may include a non-contact potentiometer including a plurality of magnetic resistance devices and the output signal may include an output voltage according to a rotation angle of a permanent magnet included in the non-contact potentiometer.

The converting of the output signal into the color identification information may include converting the output signal into the color identification information, based on at least one mapping information. The at least one mapping information may include mapping information between a signal capable of being output from the color changer and a digital signal, and mapping information between the digital signal and color identification information for the electronic device.

A notification of color information corresponding to the color identification information may be displayed on a display of the data input device.

A notification of color information corresponding to the color identification information may be output through an audio outputter of the data input device.

The converting of the received output signal into the color identification information may include converting the output signal into the color identification information based on mapping information of the electronic device from among mapping information about a plurality of electronic devices, in response to generating the output signal. The mapping information may include mapping information between a signal capable of being output from the color changer and a digital signal, and mapping information between the digital signal and color identification information for the electronic device.

BRIEF DESCRIPTION OF THE DRAWINGS

These and/or other aspects will become apparent and more readily appreciated from the following description of exemplary embodiments, taken in conjunction with the accompanying drawings in which:

FIG. 5 is a view illustrating an example of mapping information between an output voltage preset in a data input device and a digital signal, according to an exemplary embodiment;

FIG. 6 is a view illustrating an example of mapping information between a digital signal used in a data input device and data in an HID format, according to an exemplary embodiment;

FIG. 7 is a view illustrating an example of mapping information between color identification information capable of being used in an electronic device and color information, according to an exemplary embodiment;

DETAILED DESCRIPTION OF EXEMPLARY EMBODIMENTS

Figure 1:
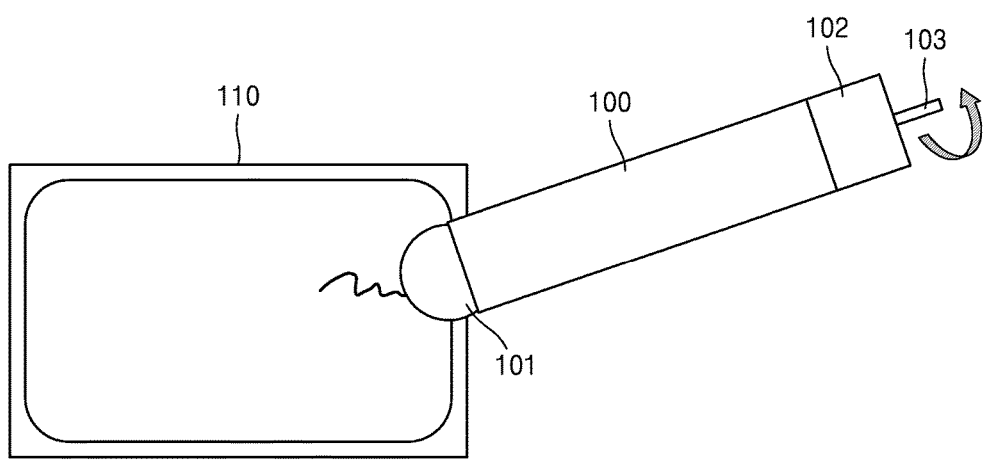
FIG. 1 is a view illustrating an example of a data input system including a data input device and an electronic device, according to an exemplary embodiment.

Various exemplary embodiments will be described in detail with reference to the accompanying drawings, wherein like reference numerals refer to like elements throughout. While the exemplary embodiments may have different forms and should not be construed as being limited to the descriptions set forth herein. Accordingly, exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. Also, well-known functions or constructions are not described in detail since they would obscure exemplary embodiments with unnecessary detail.

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

FIG. 1 is a view illustrating an example of a data input system including a data input device 100 and an electronic device 110, according to an exemplary embodiment.

The data input device 100 may touch an electronic medium such as a touch panel with a pen tip 101 and input data. Therefore, the data input device 100 may be an electronic pen or a stylus pen. The pen tip 101 may be formed of a material (e.g., silicon) having conductivity when touches the electronic medium such as a touch panel. However, the pen tip 101 is not limited thereto. For example, the pen tip 101 may be formed of a decompressed material.

A shape of the pen tip 101 may vary according to a material for forming the pen tip 101. For example, a shape (e.g., a rounded tip shape) of the pen tip 101 formed of a conductive material may be different from a shape (e.g., a sharpened tip shape) of the pen tip 101 formed of a decompressed material.

The pen tip 101 may be fixed in the data input device 100. The pen tip 101 may move inward or outward of the data input device 100 according to whether the pen tip 101 touches the electronic medium such as a touch panel. The pen tip 101 may project from the data input device 100.

The data input device 100 may change a color of data to be input to the electronic device 110 via a color changer 102. The color changer 102 may set one color from among a plurality of colors. Therefore, the color changer 102 may be a color setting unit. The data input device 100 may change a color of data to be input as a rotation shaft 103 included in the color changer 102 is rotated.

As illustrated in FIG. 1, the color changer 102 may be formed in an edge of the data input device 100, but a position of the color changer 102 is not limited thereto. For example, the color changer 102 may be formed at a position adjacent to the pen tip 101 or a part of the data input device 100.

The electronic device 110 may include the electronic medium such as a touch panel formed on the surface of a display. The touch panel may include a touch sensor capable of detecting an input via the data input device 100 or a finger. The touch panel may be an electrostatic capacitance type touch panel but is not limited thereto. For example, the touch panel may be a decompression type touch panel.

The electronic device 110 may form a protection cover on the surface of the touch panel. The protection cover may be formed of a light transmissive material such as polypropylene. The electronic device 110 may display or select input data obtained by touching the touch panel with the pen tip 101 of the data input device 100.

The electronic device 110, for example, may be a smart phone, an electronic blackboard, a personal digital assistant (PDA), a smart television, a tablet personal computer (PC), or an Internet of Things (IoT) network-based device but is not limited thereto. The electronic device 110 may be used together with the data input device 100.

Figure 2:
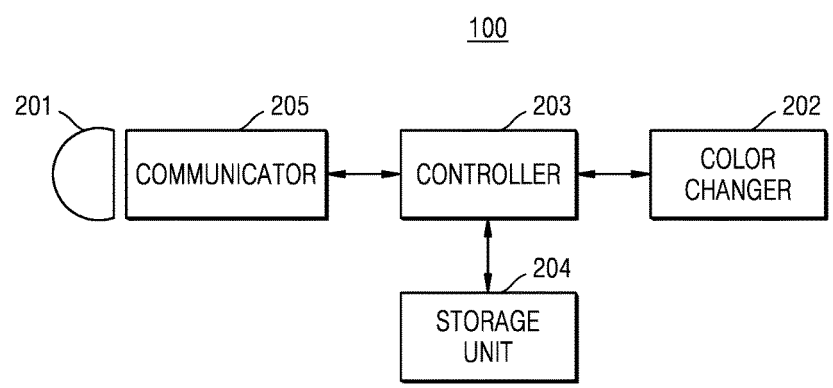
FIG. 2 is a functional block diagram of a data input device according to an exemplary embodiment.

FIG. 2 is a functional block diagram of the data input device 100 according to an exemplary embodiment. Referring to FIG. 2, the data input device 100 may include a pen tip 201, a color changer 202, a controller 203, a storage 204, and a communicator 205.

The pen tip 201 may be formed of a material having conductivity when touches a touch panel of the electronic device 110, but may also be formed of a decompressed material. The data input device 100 may input data to the electronic device 110 by touching an electronic medium such as a touch panel with the pen tip 201 or select data displayed on a display of the electronic device 110. The pen tip 201 may be the same as the pen tip 101 of FIG. 1.

The color changer 202 may change a color of data to be input to the electronic device 110 via the pen tip 201.

Figure 3:
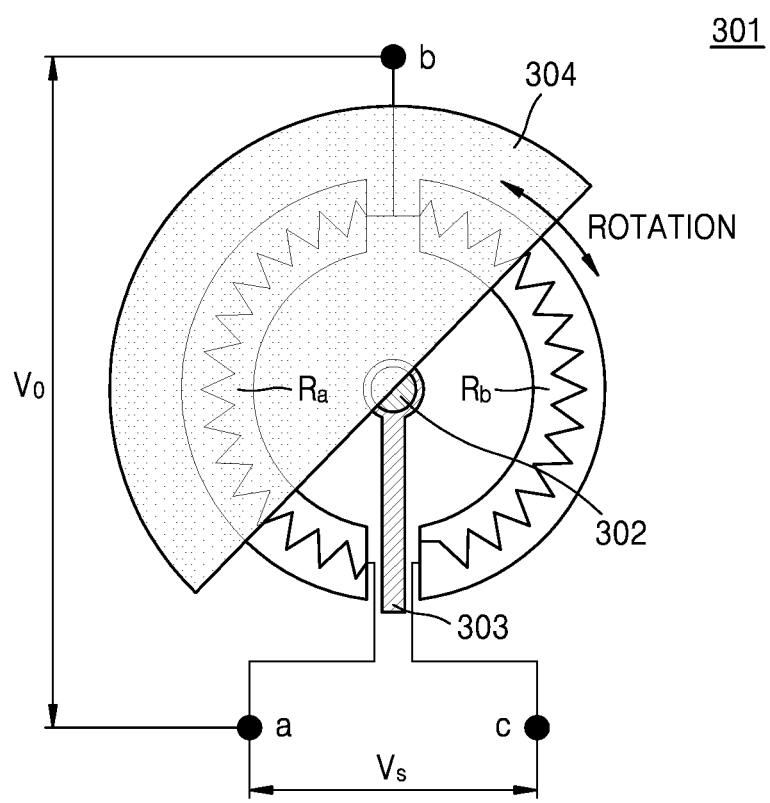
FIG. 3 is a view illustrating an example of a color changer in a data input device, according to an exemplary embodiment.

FIG. 3 is a view illustrating an example of the color changer 202 included in the data input device 100, according to an exemplary embodiment. Referring to FIG. 3, the color changer 202 may include a non-contact potentiometer 301 using a plurality of magnetic resistance devices Ra and Rb as a resistor. Therefore, an output signal of the color changer 202 may be an output voltage of the non-contact potentiometer 301.

When the plurality of magnetic resistance devices Ra and Rb and a permanent magnet 304 are in a non-contact state, the non-contact potentiometer 301 hardly generates contact noise while the permanent magnet 304 is rotating.

The non-contact potentiometer 301 may rotate the permanent magnet 304 by a wiper 303 attached to a rotation shaft 302. The permanent magnet 304 may be rotated in a clockwise direction or a counter-clockwise direction. When the permanent magnet 304 is rotated, an output voltage Vo of the non-contact potentiometer 301 may change as a resistance value of the plurality of magnetic resistance devices Ra and Rb arranged below the permanent magnet 304 changes. Due to superior responsiveness that the output voltage Vo changes according to a rotation of the permanent magnet 304, the data input device 100 may rapidly change a color of data to be input, according to an exemplary embodiment.

However, a shape of the wiper 303 attached to the rotation shaft 302 is not limited to FIG. 3. For example, a length of the wiper 303 may be shorter or longer than that illustrated in FIG. 3. Furthermore, a length of the wiper 303 may be determined according to a position of the rotation shaft 302 and a size of the permanent magnet 304. The wiper 303 may be arranged on an upper end of the permanent magnet 304.

The non-contact potentiometer 301 may have a permanent lifetime since the rotation shaft 302 is maintained by a bearing, and thus, has a small rotational torque and no abrasion.

The output voltage Vo according to a rotation of the permanent magnet 304 included in the non-contact potentiometer 301 may be defined according to Equation 1 below.

$$V_o = \frac{R_a}{R_a + R_b} Vs \qquad \text{[Equation 1]}$$

In Equation 1, Vo is an output voltage of the non-contact potentiometer 301. Vs, which is source voltage (or an input voltage, Vin) of the non-contact potentiometer 301, may be provided from a battery (or a power supply) included in the data input device 100. Ra and Rb are magnetic resistance devices of which resistance values change according to a rotation of the permanent magnet 304.

Figure 4:
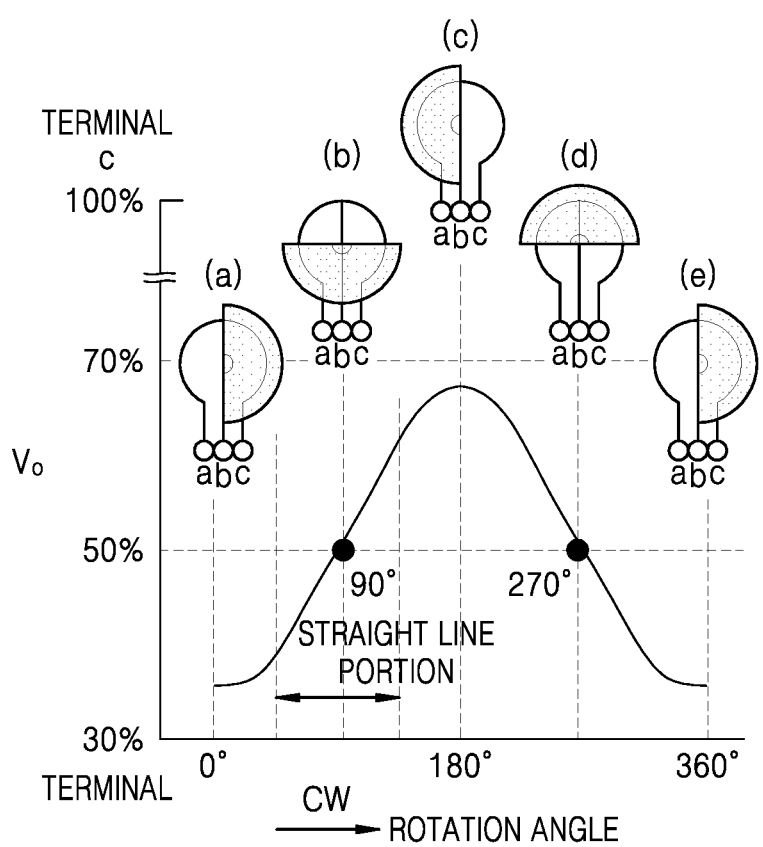
FIG. 4 is a graph illustrating an example of a relationship between a rotation angle of a permanent magnet in a non-contact potentiometer included in a data input device and an output voltage of the non-contact potentiometer, according to an exemplary embodiment.

FIG. 4 is a graph illustrating an example of a relationship between a rotation angle of the permanent magnet 304 included in the non-contact potentiometer 301 included in the data input device 100 and the output voltage of the non-contact potentiometer 301, according to an exemplary embodiment. In FIG. 4, the permanent magnet 304 rotates in a clockwise direction (CW).

Referring to FIG. 4, when the rotation angle of the permanent magnet 304 is 0° or 360°, a relationship between Ra and Rb, which are a plurality of magnetic resistance devices, may be Ra<<Rb. Therefore, the output voltage Vo may have a minimum value.

When the rotation angle of the permanent magnet 304 is 90° and 270°, a relationship between Ra and Rb, which are a plurality of magnetic resistance devices, may be Ra=Rb. Therefore, the output voltage Vo becomes Vs/2.

When the rotation angle of the permanent magnet 304 is 180°, a relationship between Ra and Rb, which are a plurality of magnetic resistance devices, may be Ra>>Rb. Therefore, the output voltage Vo may have a maximum value.

As such, when the rotation angle of the permanent magnet 304 is 0° and 360°, the output voltage of the non-contact potentiometer 301 may have a value corresponding to 30% of the maximum output voltage. When the rotation angle of the permanent magnet 304 is 90° and 270°, the output voltage of the non-contact potentiometer 301 may have a value corresponding to 50% of the maximum output voltage. When the rotation angle of the permanent magnet 304 is 180°, the output voltage of the non-contact potentiometer 301 may have the maximum output voltage.

As illustrated in FIG. 4, when the output voltage is output, the data input device 100 may change data to be input into three kinds of colors. In FIG. 4, (a), (b), and (c) may correspond to terminals (a), (b), and (c) illustrated in FIG. 3, respectively.

However, a relationship between a rotation angle of the permanent magnet 304 and the output voltage Vo of the non-contact potentiometer 301 is not limited to that illustrated in FIG. 4. For example, a color of data to be input may be changed by dividing a rotation angle of the permanent magnet 304 shown in FIG. 4 by 90°.

The data input device 100 may change a color of data to be input by dividing a rotation angle of the permanent magnet 304 by 45°. If the rotation angle of the permanent magnet 304 is divided by 45°, the data input device 100 may change data to be input into five kinds of colors.

Furthermore, the data input device 100 may change a color of data to be input by dividing the rotation angle of the permanent magnet 304 by 30°. If the rotation angle of the permanent magnet 304 is divided by 30°, the data input device 100 may change data to be input into seven kinds of colors.

The data input device 100 may determine the number of colors capable of being changed in correspondence to data to be input according to the rotation angle of the permanent magnet 304.

The potentiometer 301 is not limited to that illustrated in FIG. 3. For example, the potentiometer 301, without using the wiper 303, may rotate the permanent magnet 304 by a certain angle (for example, 30°, 45°, or 90°) whenever the rotation shaft 302 is pushed. Therefore, an element, which is capable of rotating the permanent magnet 304 by a certain angle whenever the rotation shaft 302 is pushed down, may be attached between the rotation shaft 302 and the permanent magnet 304.

When the output voltage of the non-contact potentiometer 301, which is an output signal of the color changer 202, is received, the controller 203 may convert the output voltage into color identification information. The controller 203 may convert the output voltage into a digital signal and convert the digital signal into color identification information. The color identification information indicates information obtained based on a communication method (or a communication protocol) between the data input device 100 and the electronic device 110 used for recognizing color information exchanged between the data input device 100 and the electronic device 110. Therefore, color identification information may be separately defined according to a communication method between the data input device 100 and the electronic device 110.

The controller 203 may convert the output voltage (i.e., an analog signal) into a digital signal by using mapping information between a preset output voltage and a digital signal. The preset output voltage may include a voltage capable of being output from the non-contact potentiometer 301.

FIG. 5 is a view illustrating an example of mapping information between an output voltage preset in the data input device 100 and a digital signal, according to an exemplary embodiment. Referring to FIG. 5, a digital signal mapped in an output voltage of 0.0 V to 0.3 V is 0001. A digital signal mapped in an output voltage of 0.4 V to 0.6 V is 0010, and a digital signal mapped in an output voltage of 0.7 V to 1.0 V is 0011.

In FIG. 5, a minimum output voltage of the non-contact potentiometer 301 is 0.0 V, and a maximum output voltage is 1.0 V. However, the minimum and maximum output voltages of the non-contact potentiometer 301 are not limited thereto.

The number of mapping information between the output voltage and the digital signal is not limited to three as illustrated in FIG. 5. For example, the data input device 100 may set mapping information between the output voltage and a digital signal per 0.1 V units. When mapping information is set per 0.1 V units, the number of mapping information set in the data input device 100 may be ten.

Alternatively, the data input device 100 may set mapping information between the output voltage and a digital signal per 0.2 V units. When mapping information is set per 0.2 V units, the number of mapping information set in the data input device 100 may be five. As described above, the number of colors capable of being changed by the data input device 100 may be determined according to standards of dividing an output voltage of the non-contact potentiometer 301.

The number of mapping information between the output voltage and a digital signal may be determined according to the standard manner of dividing the rotation angle of the permanent magnet 304 in FIG. 4. For example, if the rotation angle of the permanent magnet 304 is divided by 30°, the number of mapping information between the output voltage and a digital signal may be seven.

The controller 203 may convert a digital signal into color identification information according to a communication method between the data input device 100 and the electronic device 110. For example, when the communication method between the data input device 100 and the electronic device 110 is Bluetooth, the controller 203 may convert a digital signal into data in a human interface device (HID) format.

The controller 203 may use mapping information between a digital signal and data according to a communication method to convert the digital signal into the data according to the communication method.

FIG. 6 is a view illustrating an example of mapping information between a digital signal used in the data input device 100 and data in an HID format, according to an exemplary embodiment.

Referring to FIG. 6, color identification information according to an HID format corresponding to digital signal 0001 is 0x70. Color identification information according to the HID format corresponding to digital signal 0010 is 0x71. Color identification information according to the HID format corresponding to digital signal 0011 is 0x72. Color identification information according to the HID format may use data not used in the HID format (or data not defined for a specific use), but is not limited thereto.

The number of mapping information illustrated in FIG. 6 may be determined according to the number of mapping information illustrated in FIG. 5.

The controller 203 may be a processor controlling general operations of the data input device 100.

The storage 204 may store the mapping information described above. The mapping information may be stored in the storage 204 in advance when the data input device 100 is manufactured, but is not limited thereto. For example, the controller 203 may store mapping information received via the communicator 205 in the storage 204.

The storage 204 may store a program capable of controlling an operation of the data input device 100. The storage 204 may include a flash memory type memory, a hard disk type memory, a multimedia card micro type memory, a card type memory (e.g., SD or XD memory), a random access memory (RAM), a static random access memory (SRAM), a read-only memory (ROM), an electrically erasable programmable read-only memory (EEPROM), a programmable ROM (PROM), a magnetic memory, a magnetic disk, or storage medium of an optical disk type. The storage 204 may be represented as memory or a recording medium.

The electronic device 110 may provide mapping information received via the communicator 205. The mapping information received via the communicator 205 may be provided from an external near field communication (NFC) tag. The mapping information received via the communicator 205 may be provided from other devices. The other devices may include an information manage server, a wearable device, or an IoT network-based device, but are not limited thereto.

The information manage server may provide mapping information based on a favorite color of a user based on user information. A color capable of being changed corresponding to data to be input by the data input device 100 may vary according to users. For example, user B may set black, green, or red corresponding to data to be input to the electronic device 110 via the data input device 100 while user A sets black, red, or blue corresponding to data to be input to the electronic device 110 via the data input device 100.

The mapping information stored in the storage 204 may change according to a user input. The user input may be provided from the electronic device 110 via the communicator 205, but is not limited thereto. When the data input device 100 may include a component (e.g., a touch panel) capable of applying a user input, the mapping information stored in the storage 204 may be changed by using the component included in the data input device 100.

When an output signal is received from the color changer 202, the controller 203 may read mapping information from the storage 204 and use the mapping information. The controller 203 may read mapping information from the storage 204 before receiving an output signal from the color changer 202.

FIG. 7 is a view illustrating an example of mapping information between color identification information capable of being used in the electronic device 110 and color information, according to an exemplary embodiment. The mapping information illustrated in FIG. 7 may be stored in the electronic device 110, but is not limited thereto. For example, the mapping information may be stored in the storage 204 of the data input device 100.

The mapping information may be stored in the electronic device 110 when the electronic device 110 is manufactured. The mapping information may be changed according to a user input based on the electronic device 110. The mapping information may be provided from the information manage server, the wearable device, or the IoT network-based device described above.

When color identification information is received from the data input device 100, the electronic device 110 may detect color information by using the mapping information. The color information may be information about an actual color as illustrated in FIG. 7.

Referring to FIG. 7, color information corresponding to 0x70 color identification information is black. Color information corresponding to 0x71 color identification information is red. Color information corresponding to 0x72 color identification information is blue.

The electronic device 110 may display a color of input data, which is input by touching a touch panel with the pen tip 201, based on the detected color information. The number of mapping information illustrated in FIG. 7 may be determined according to the number of mapping information illustrated in FIG. 5.

The communicator 205 may transmit or receive data between the data input device 100 and the electronic device 110 by using a wireless communication method. The wireless communication method may include, for example, a short-range wireless communication method such as a Bluetooth communication method, but is not limited thereto. The wireless communication method, for example, may include a radio frequency (RF) communication method, a Zigbee communication method, or a near field communication (NFC) method, but is not limited thereto.

Figure 8:
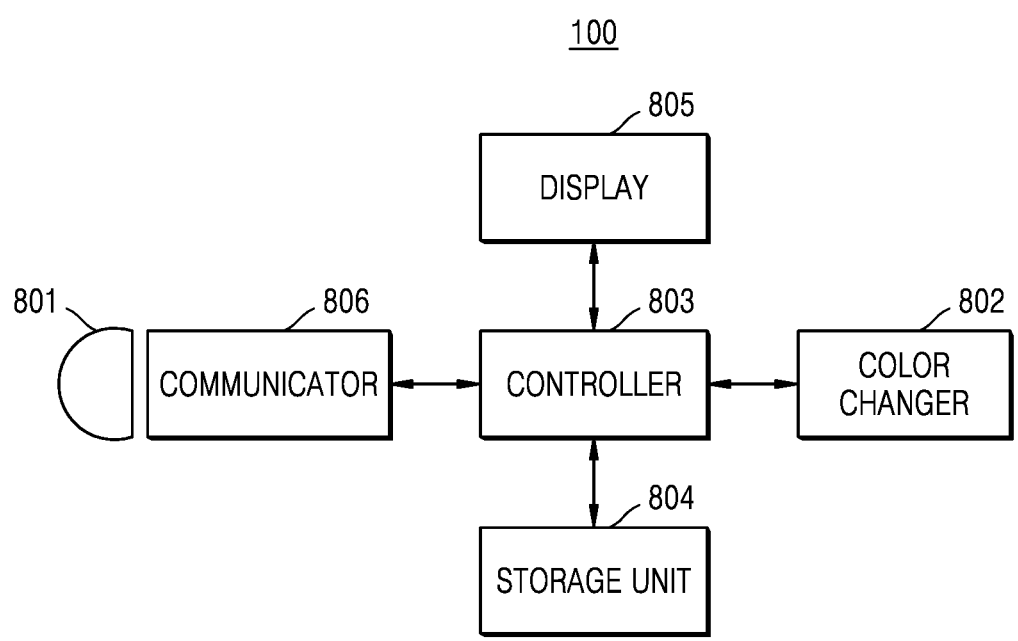
FIG. 8 is a functional block diagram of a data input device according to another exemplary embodiment.

FIG. 8 is a functional block diagram of the data input device 100 according to another exemplary embodiment. Referring to FIG. 8, the data input device 100 may include a pen tip 801, a color changer 802, a controller 803, a storage 804, a display 805, and a communicator 806.

The pen tip 801, the color changer 802, and the communicator 806 illustrated in FIG. 8 may be similar to the pen tip 201, the color changer 202, and the communicator 205 illustrated in FIG. 2 in configurations and operations.

The display 805 may be controlled by the controller 803 and display a notification about color information obtained based on an output signal of the color changer 802.

Figure 9A:
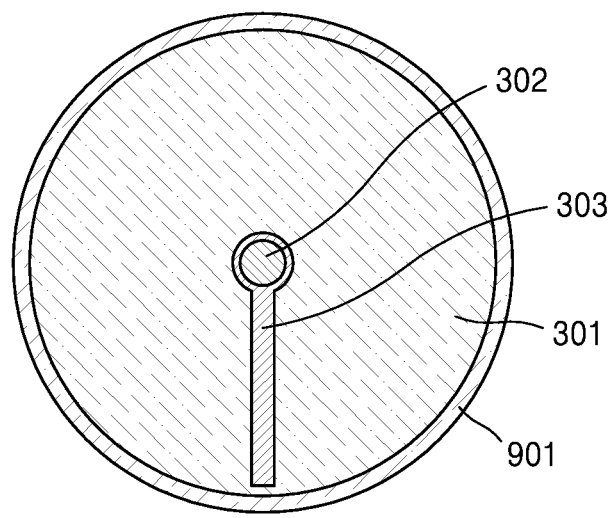
FIGS. 9A and 9B are views illustrating an example of installing a display included in a data input device, according to an exemplary embodiment.
Figure 9B:
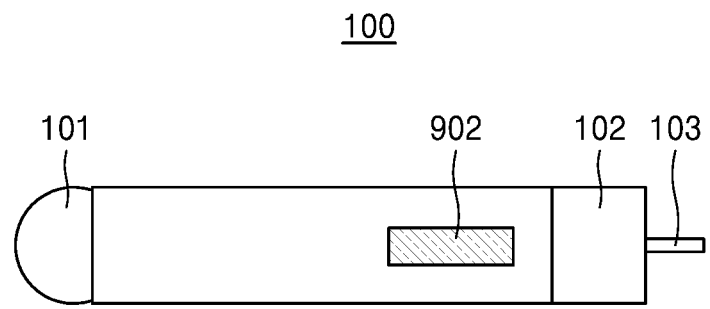

FIGS. 9A and 9B are views illustrating an example of installing the display 805 included in the data input device 100, according to an exemplary embodiment.

Referring to FIG. 9A, a display 901 corresponding to the display 805 may be formed on an external side surface or an external upper side of the color changer 802, but is not limited thereto.

The display 901 may include a light-emitting diode (LED) lamp. For example, if current color information is black, the display 901 may not emit light. If current color information is red, the display 901 may emit red color light. If current color information is blue, the display 901 may emit blue color light. In FIG. 9A, a notification provided via the display 901 may be represented as color information.

The controller 803, in order to control the display 901 as described above, may detect color information based on mapping information as illustrated in FIG. 7. The storage 804 may store the mapping information illustrated in FIGS. 5 to 7. The controller 803 may read the mapping information stored in the storage 804 and detect the color information described above from an output signal of the color changer 802.

In FIG. 9B, a display 902 corresponding to the display 805 is located in a side surface of the data input device 100. When the display 902 is installed as illustrated in FIG. 9B, the controller 803 may display a notification about color information in the display 902. In FIG. 9B, the notification may be represented by a symbolic word (e.g., R (red)) corresponding to color information, an abbreviation (e.g., Bl (Blue)), or color information (e.g., Black), but is not limited thereto. For example, in FIG. 9B the same as in FIG. 9A, the data input device 100 may provide a notification with color information.

While displaying a notification via the display 902 as illustrated in FIG. 9B, the controller 803 may display the notification while moving the notification in one direction (e.g., in an upper, a lower, a right or a left direction).

Figure 10:
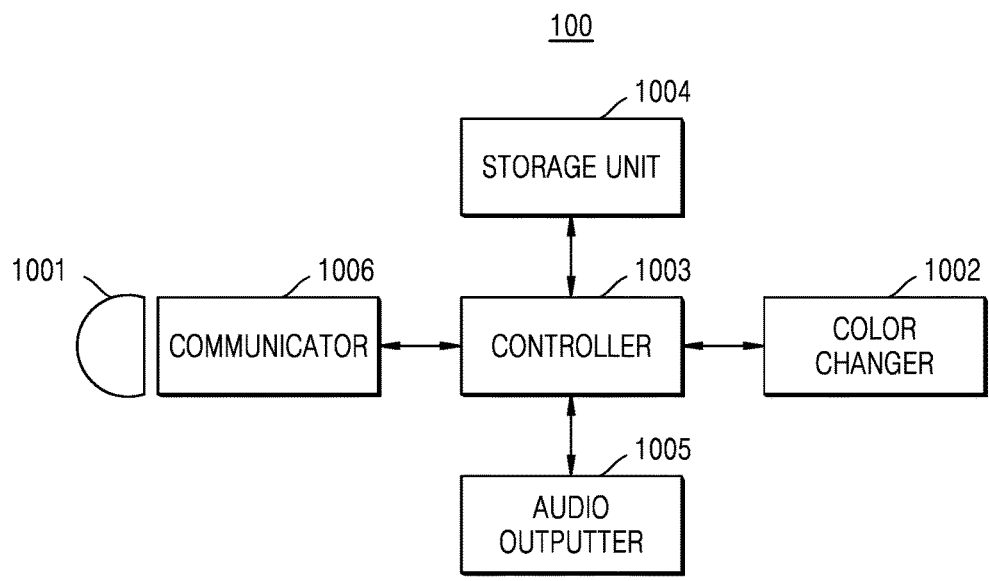
FIG. 10 is a functional block diagram illustrating a data input device according to another exemplary embodiment.

FIG. 10 is a functional block diagram illustrating the data input device 100 according to another exemplary embodiment.

Referring to FIG. 10, the data input device 100 may include a pen tip 1001, a color changer 1002, a controller 1003, a storage 1004, an audio outputter 1005, and a communicator 1006. The pen tip 1001, the color changer 1002, the storage 1004, and the communicator 1006 illustrated in FIG. 10 may be similar to the pen tip 801, the color changer 802, the storage 804, and the communicator 806 illustrated in FIG. 8 in configurations and operations.

When color information is detected based on an output signal of the color changer 1002, the controller 1003 may output a notification about the detected color information via the audio outputter 1005. In order that, the storage 1004 may store the mapping information illustrated in FIGS. 5 to 7 like the storage 804 illustrated in FIG. 8.

The audio outputter 1005 may output a notification about color information with an audio signal. The audio outputter 1005 may include a speaker.

Figure 11:
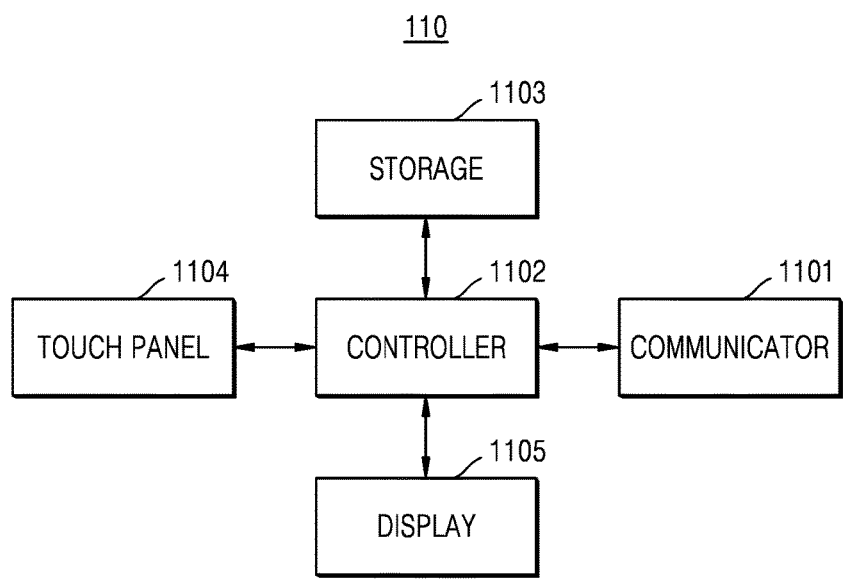
FIG. 11 is a functional block diagram illustrating an electronic device according to an exemplary embodiment.

FIG. 11 is a functional block diagram illustrating the electronic device 110 according to an exemplary embodiment. Referring to FIG. 11, the electronic device 110 may include a communicator 1101, a controller 1102, a storage 1103, a touch panel 1104, and a display 1105.

The communicator 1101 may transmit or receive data with the data input device 100 by using a wireless communication method. The communicator 1101 may transmit or receive data with other electronic devices. The communicator 1101 may receive color identification information from the data input device 100.

The communicator 1101 may include at least one of a short-range communicator, a mobile communicator, and a broadcast receiver, but is not limited thereto.

The short-range communicator may include a Bluetooth communication module, a Bluetooth low energy (BLE) communication module, a Near filed communication (NFC) module, radio frequency identification (RFID) module, a wireless local area network (WLAN) communication module, a Zigbee communication module, an Ant+ communication module, a wireless fidelity (Wi-Fi) direct (WFD) communication module, a beacon communication module, or an ultra-wideband (UWB) communication module, but is not limited thereto. For example, the short-range communicator may include an infrared data association (IrDA) communication module.

The mobile communicator may transmit or receive a wireless signal with at least one of a base station, an external device, and a server on a mobile communication network. Here, the wireless signal may be a voice call signal, a video call signal, or data in any one of various formats according to transmission and reception of a text/multimedia message.

The broadcast receiver may receive a broadcast signal and/or information about a broadcast via a broadcast channel from outside. The broadcast channel may include at least one of a satellite channel, a terrestrial channel, and a radio channel, but is not limited thereto.

The communicator 1101 may include a global positioning system (GPS) receiver.

When color identification information is received from the communicator 1101, the controller 1102 may display a color of data, which is input through the touch panel 1104, on the display 1105 based on the received color identification information. In order that, the controller 1102 may execute an exclusive application stored in the storage 1103. The exclusive application may be a color change application with respect to input data.

Furthermore, the controller 1102 may detect color information corresponding to the color identification information by using the mapping information of FIG. 7, which is stored in the storage 1103. The detected color information corresponding to the color identification information may be converted into the color information.

The controller 1102 may be a processor controlling general operations of the electronic device 110.

The storage 1103 may store the mapping information of FIG. 7. The storage 1103 may store the mapping information in advance. The mapping information stored in the storage 1103 may be changed according to a user input. The user input may be received by an input operation of the data input device 100, which is received through the touch panel 1104 based on information displayed on the display 1105.

The storage 1103 may include a flash memory type memory, a hard disk type memory, a multimedia card micro type memory, a card type memory (for example, SD or XD memory), RAM, SRAM, ROM, EEPROM, PROM, a magnetic memory, a magnetic disk, or storage medium of an optical disk type. The storage 1103 may be represented as a memory or a non-transitory computer-readable recording medium.

The storage 1103 may store an operating system (OS) program of the electronic device 110 and various applications. The various applications may include a color change application of data to be input based on the data input device 100 according to the exemplary embodiments.

Programs stored in the storage 1103 may be classified into a plurality of modules according to a function thereof, for example, a broadcast receive module (or a DMB module), a mobile communication module, a Wi-Fi module, a Bluetooth module, a sensor module, a GPS module, a moving image reproduction module, an audio reproduction module, a power module, a touch screen module, a user interface (UI) module, and/or an application module.

Figure 12:
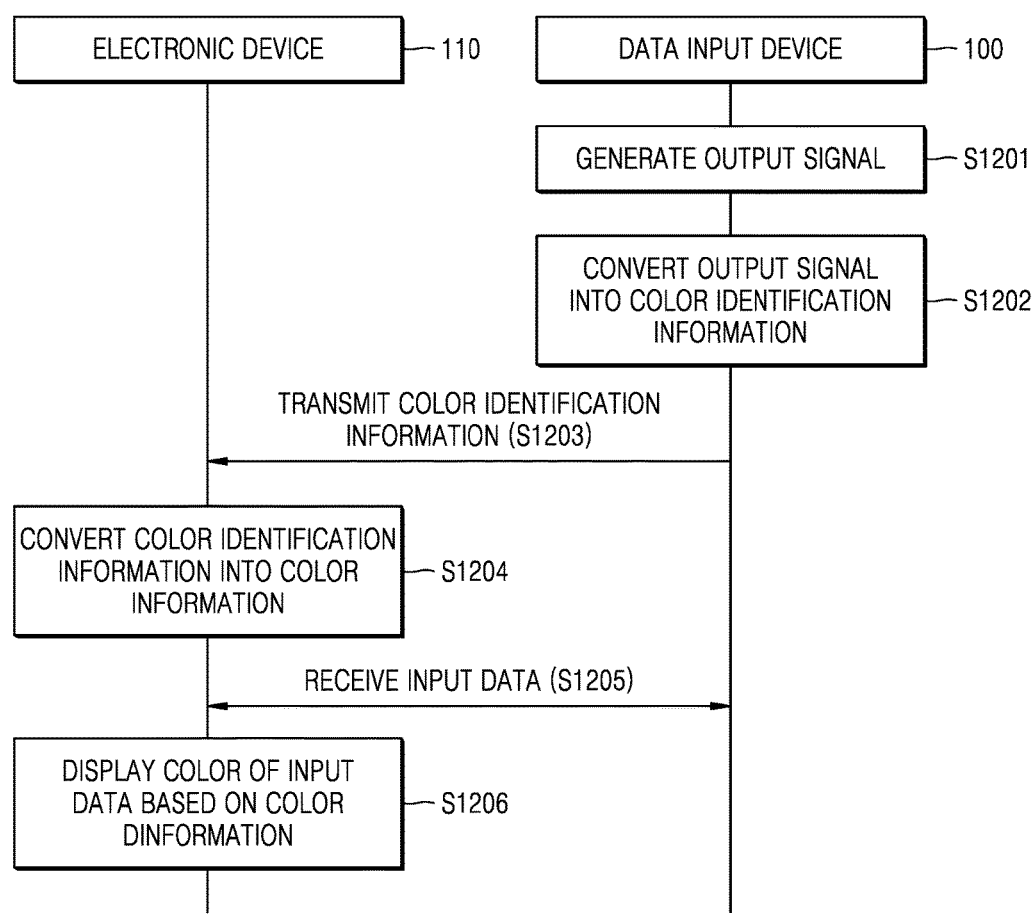
FIG. 12 is a flowchart of a method of changing a color of data to be input to an electronic device via a data input device according to an exemplary embodiment.

FIG. 12 is a flowchart of a method of changing a color of data to be input to an electronic device 110 via the data input device 100 according to an exemplary embodiment. In FIG. 12, when the data input device 100 provides color identification information to the electronic device 110, the electronic device 110 may display the color of data input by the data input device 100 as color information corresponding to the received color identification information.

Referring to FIG. 12, in operation S1201, the color changer 102 may generate an output signal by rotating the rotation shaft 103 of the color changer 102, which is mounted on the data input device 100, and in operation S1202, the data input device 100 may convert the output signal into color identification information. In order to convert the output signal into the color identification information, the data input device 100 may use the mapping information illustrated in FIGS. 5 and 6.

In operation S1203, the data input device 100 may transmit the color identification information to the electronic device 110. In operation S1204, the electronic device 110 may convert the received color identification information into color information. For that, the electronic device 110 may use the mapping information of FIG. 7. The converting of the received color identification information into the color information may include detecting of color information from the received color identification information.

In operation S1205, when input data is received by the data input device 100, in operation S1206, the electronic device 110 may display a color of the input data based on the color information.

Figure 13:
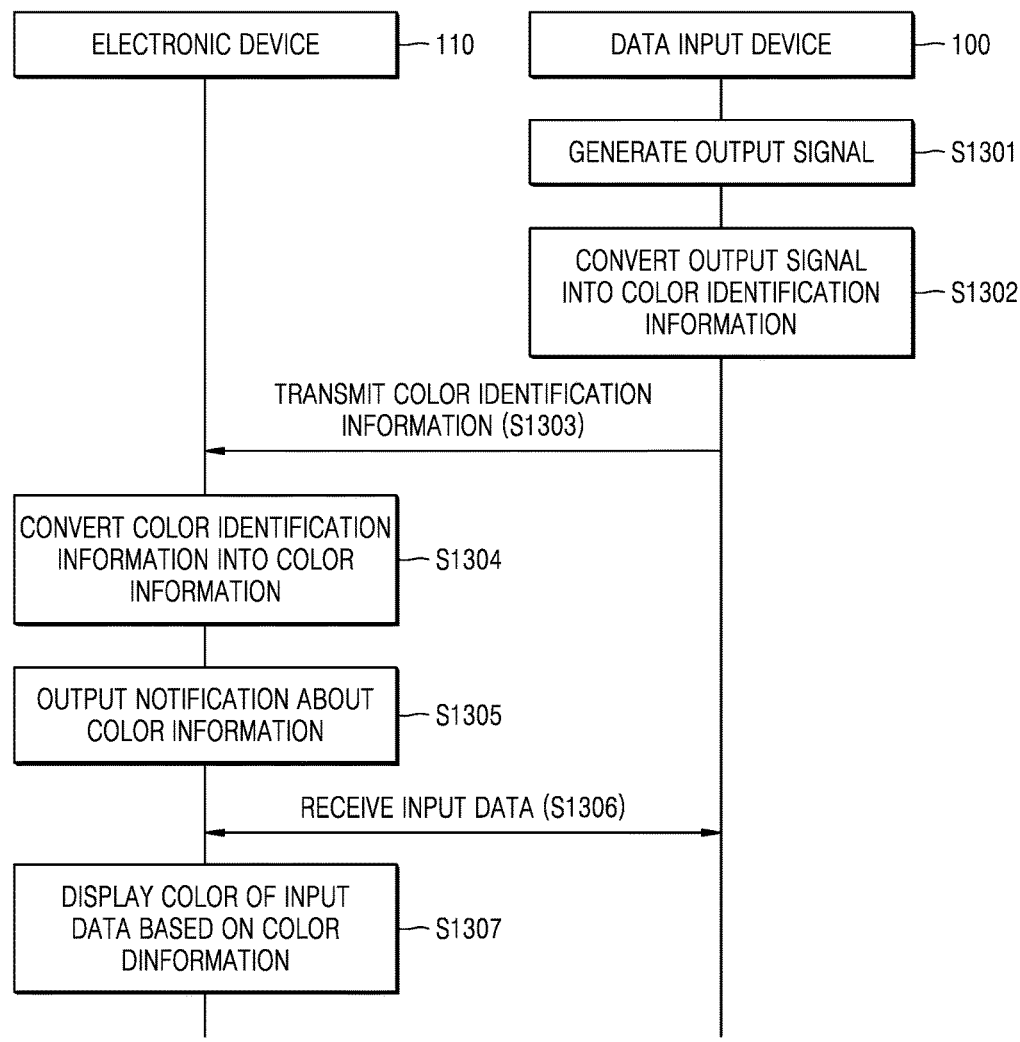
FIG. 13 is a flowchart of a method of changing a color of data to be input to an electronic device via a data input device according to an exemplary embodiment.

FIG. 13 is a flowchart of a method of changing a color of data to be input to the electronic device 110 via a data input device 100 according to an exemplary embodiment. In FIG. 13, the electronic device 110 may receive color identification information from the data input device 100, and display guide information about color information corresponding to the received color identification information.

Referring to FIG. 13, in operation S1301, the color changer 102 may generate an output signal by rotating the rotation shaft 103 of the color changer 102, which is mounted on the data input device 100, and in operation S1302, the data input device 100 may convert the output signal into color identification information.

In operation S1303, the data input device 100 may transmit the color identification information to the electronic device 110. In operation S1304, the electronic device 110 may convert the color identification information into color information. The electronic device 110 may convert the color information into color information by using the mapping information of FIG. 7.

In operation S1305, the electronic device 110 may output a notification about color information.

Figure 14:
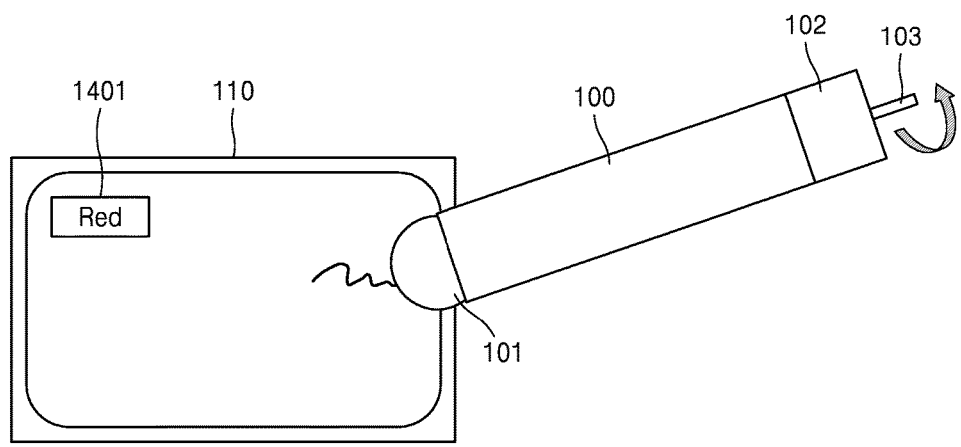
FIG. 14 is a view illustrating an example of displaying a notification in operation S1305 of FIG. 13.

FIG. 14 is a view illustrating an example of displaying the notification in operation S1305 of FIG. 13. Referring to FIG. 14, the electronic device 110 may display a notification (e.g., Red) related to color information on a partial region 1401 of the display 1105, but is not limited thereto. For example, the electronic device 110 may display a color mark corresponding to color information on a partial region of the display 1105.

In operation S1306 of FIG. 13, when input data is received by the data input device 100, in operation S1307, the electronic device 110 displays a color of the input data based on the color information of operation S1304.

Figure 15:
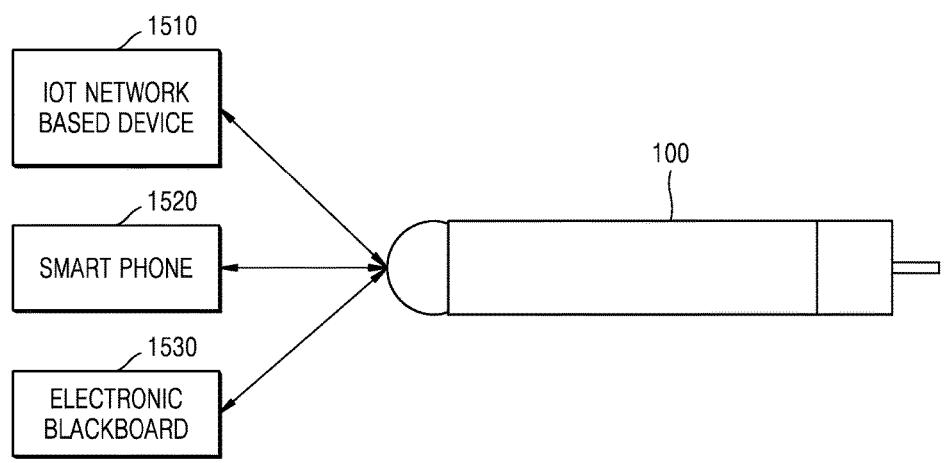
FIG. 15 is a view illustrating an example of using a data input device in a plurality of electronic devices according to an exemplary embodiment.

FIG. 15 is a view illustrating an example of using the data input device 100 in a plurality of electronic devices 1510, 1520, and 1530, according to an exemplary embodiment.

Referring to FIG. 15, the plurality of electronic devices 1510, 1520, and 1530 may include an IoT network-based device 1510, a smart phone 1520, and an electronic blackboard 530. The data input device 100 may input data to the plurality of electronic devices 1510, 1520, and 1530.

If an electronic device currently communicating with the data input device 100 is the IoT network-based device 1510, the data input device 100 may transmit color identification information capable of being recognized by the IoT network-based device 1510 to the IoT network-based device 1510. For that, the data input device 100 may use mapping information for the IoT network-based device 1510.

The IoT network-based device 1510 may include, for example, smart household appliances or smart office equipment.

If an electronic device currently communicating with the data input device 100 is the smart phone 1520, the data input device 100 may transmit color identification information capable of being recognized by the smart phone 1520 to the smart phone 1520. For that, the data input device 100 may use mapping information for the smart phone 1520.

If an electronic device currently communicating with the data input device 100 is the electronic blackboard 1530, the data input device 100 may transmit color identification information capable of being recognized by the electronic blackboard 1530 to the electronic blackboard 1530. For that, the data input device 100 may use mapping information for the electronic blackboard 1530.

Figures 16, 17:
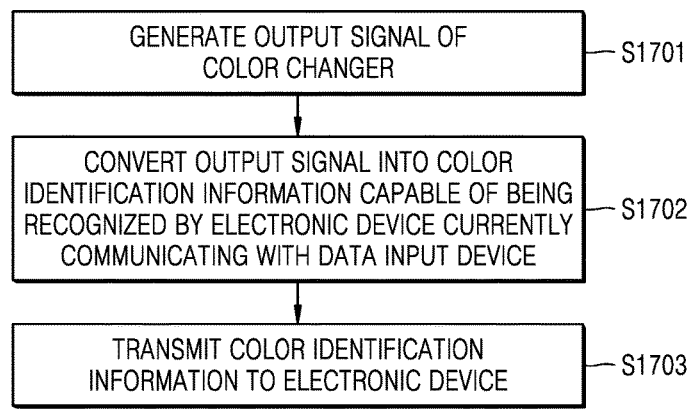
FIG. 16 is an exemplary view illustrating mapping information to be stored in a data input device according to an exemplary embodiment.
FIG. 17 is a flowchart of a method of changing a color of data to be input to an electronic device via a data input device according to an exemplary embodiment.

FIG. 16 is an exemplary view illustrating mapping information to be stored in the data input device 100 according to an exemplary embodiment. Referring to FIG. 16, the mapping information may include color identification information about the IoT network-based device 1510, the smart phone 1520, and the electronic blackboard 1530.

The data input device 100 may provide color identification information about a plurality of electronic devices by using the mapping information illustrated in FIG. 16.

FIG. 17 is a flowchart of a method of changing a color of data to be input to the electronic device 110 via the data input device 100 according to an exemplary embodiment.

Referring to FIG. 17, in operation S1701, the data input device 100 may generate an output signal of the color changer 102. The output signal of the color changer 102 may be generated by a rotation of the rotation shaft 103.

In operation S1702, the data input device 100 may convert the output signal into color identification information capable of being recognized by the electronic device 110 currently communicating with the data input device 100. For that, the data input device 100 may use mapping information related to the electronic device 110 currently communicating with the data input device 100 from among the mapping information illustrated in FIG. 16.

In operation S1703, the data input device 100 may transmit the color identification information to the electronic device 110 currently communicating with the data input device 100.

Figure 18:
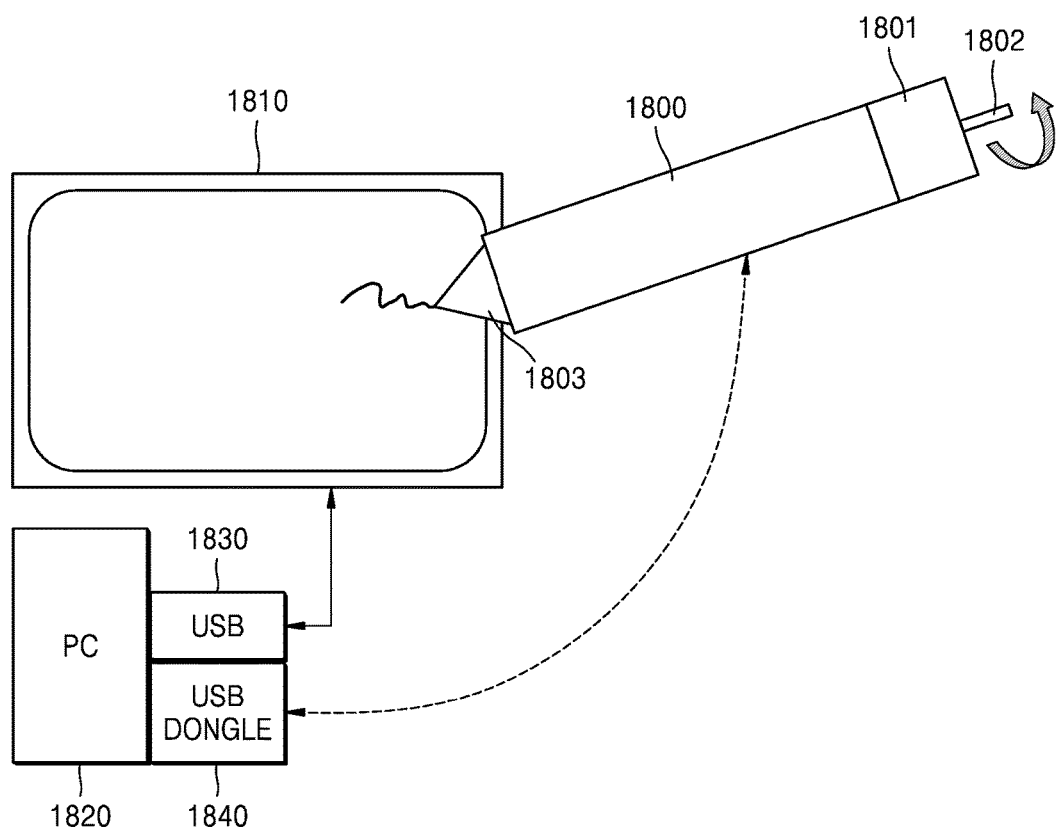
FIG. 18 is an exemplary view illustrating a data input device applied to an electronic blackboard, according to another exemplary embodiment.

FIG. 18 is an exemplary view illustrating a data input device 1800 applied to an electronic blackboard 1810, according to another exemplary embodiment.

Referring to FIG. 18, when an output signal is generated by rotating a rotation shaft 1802 of the color converter 1801, the data input device 1800 may convert the generated output signal into color identification information. The data input device 1800 may transmit the converted color identification information to a universal serial bus (USB) dongle 1840 of a personal computer (PC) 1820 which controls the electronic blackboard 1810. When the color identification information is received through the USB dongle 1840, the PC 1820 may convert the received color identification information into color information. The USB dongle 1840 is an exterior peripheral device enabling the PC 1820 and the data input device 1800 to transmit or receive data therebetween based on a Bluetooth communication. The USB dongle 1840 may enable the PC 1820 and another device to transmit or receive data therebetween based on the Bluetooth communication.

When a pen tip 1803 of the data input device 1800 touches a touch panel on the surface of a display of the electronic blackboard 1810, the electronic blackboard 1810 may transmit coordinate information of the touched point to the PC 1820 through a USB 1830. Accordingly, the PC 1820 may transmit input data based on the color information to the electronic blackboard 1810 through the USB 1830, and the electronic blackboard 1810 may display the input data based on the color information.

The electronic blackboard 1810 may include the display and the touch panel of FIG. 1. The electronic blackboard 1810 may be connected to the PC 1820 through the USB 1830.

A configuration of the data input device 1800 illustrated in FIG. 18 may be the same as that of the data input device 100 of some exemplary embodiments described above.

However, configurations of the data input devices 100 and 1800 and the electronic device 110 are not limited thereto. For example, an electronic device may be a wearable device. The wearable device may include a device such as smart glasses, a smart watch, a smart band (e.g., a smart waist band, a smart hair band, etc.), various smart accessories (e.g., a smart ring, a smart bracelet, a smart anklet, a smart hair pin, a smart clip, and a smart necklace), various smart body protectors (e.g., a smart knee protector, and a smart elbow protector), smart shoes, smart gloves, smart clothing, a smart hat, a smart artificial leg, or a smart artificial hand, but is not limited thereto.

The term "module" used in various exemplary embodiments may refer to, for example, a unit including one of hardware, software, and firmware, or a combination of two or more thereof. The term "module" may be interchangeable with a term, such as a unit, a logic, a logical block, a component, a circuit, and so on. A module may be a smallest unit of an integrated component or a part thereof. A module may be a smallest unit for performing one or more functions or a part thereof. A module may be mechanically or electronically implemented. For example, a module according to various exemplary embodiments may include at least one of an application-specific integrated circuit (ASIC) chip, field-programmable gate arrays (FPGAs), and a programmable-logic device for performing operations which are known or will be developed in the future.

Exemplary embodiments may be written as computer programs and may be implemented in general-use digital computers that execute the programs using a computer readable recording medium. The computer readable medium may be any usable medium that may be accessed by a computer, and include any usable medium, such as, a volatile and non-volatile medium and a discrete type and non-discrete type medium. Also, the computer readable medium may include all computer storing media and communication media. The computer storing medium may include any medium, such as, a volatile and non-volatile medium and a discrete type and non-discrete type medium that is realized by a method or technique for storing information, such as, a computer readable command, a data structure, a program module, or other data. The communication medium may include other data of modulated signal, such as, a computer readable command, a data structure, a program module, or a carrier signal, or other transmission mechanism, and an arbitrary information medium.

Exemplary embodiments are examples, and thus, it will be understood by those of ordinary skill in the art that various changes in form and details may be made therein without departing from the spirit and scope of the inventive concept. Therefore, exemplary embodiments should be considered in descriptive sense only and not for purposes of limitation. For example, each constituent element that is described as a singular form may be embodied in distribution forms. Also, constituent elements that are described in distribution forms may be embodied in a combined form.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the appended claims.

What is claimed is:

1. A data input device comprising:
a color changer configured to change a color of data to be input to an electronic device;
a communicator configured to communicate with the electronic device;
a controller configured to receive an output signal from the color changer, convert the received output signal into color identification information, and control the communicator to transmit the converted color identification information to the electronic device; and
a storage configured to store mapping information for converting the output signal into the color identification information,
wherein the mapping information comprises:
first mapping information indicating a mapping relationship between the output signal and a digital signal; and
second mapping information indicating a mapping relationship between the digital signal and the color identification information, and
wherein the color changer comprises a non-contact potentiometer including a plurality of magnetic resistance devices, and the output signal comprises an output voltage according to a rotation angle of a permanent magnet included in the non-contact potentiometer.

2. The data input device of claim 1, further comprising:
a display configured to display a notification of color information corresponding to the color identification information.

3. The data input device of claim 1, further comprising:
an audio outputter configured to output an audio signal of color information corresponding to the color identification information.

4. The data input device of claim 1, wherein
the communicator is further configured to transmit the color identification information to the electronic device wirelessly.

5. The data input device of claim 1, wherein the storage further stores mapping information about a plurality of electronic devices,
wherein the controller is further configured to use the mapping information about the electronic device from among the mapping information about the plurality of electronic devices.

6. An operation method of a data input device, the operation method comprising:
generating, by the data input device, an output signal of a color changer capable of changing a color of data to be input to an electronic device;
converting, by the data input device, the output signal into color identification information based on mapping information;
transmitting, by the data input device, the color identification information to the electronic device through a communicator of the data input device,
wherein the mapping information comprises:
first mapping information indicating a mapping relationship between the output signal and a digital signal; and
second mapping information indicating a mapping relationship between the digital signal and the color identification information, and
wherein the color changer comprises a non-contact potentiometer including a plurality of magnetic resistance devices, and the output signal comprises an output voltage according to a rotation angle of a permanent magnet included in the non-contact potentiometer.

7. The operation method of claim 6, further comprising:
displaying a notification of color information corresponding to the color identification information on a display of the data input device.

8. The operation method of claim 6, further comprising:
outputting a notification of color information corresponding to the color identification information through an audio outputter of the data input device.

9. The operation method of claim 6, wherein
the converting of the received output signal into the color identification information comprises:
converting the output signal into the color identification information based on the mapping information of the electronic device from among mapping information about a plurality of electronic devices.

10. A non-transitory computer-readable recording medium having recorded thereon a program for executing an operation method of a data input device, the operation method comprising:

generating, by the data input device, an output signal of a color changer capable of changing a color of data to be input to an electronic device;

converting, by the data input device, the output signal into color identification information based on mapping information;

transmitting, by the data input device, the color identification information to the electronic device through a communicator of the data input device, wherein the mapping information comprises:

- first mapping information indicating a mapping relationship between the output signal and a digital signal; and
- second mapping information indicating a mapping relationship between the digital signal and the color identification information, and wherein the color changer comprises a non-contact potentiometer including a plurality of magnetic resistance devices, and the output signal comprises an output voltage according to a rotation angle of a permanent magnet included in the non-contact potentiometer.

\* \* \* \* \*